(12) United States Patent
Beasley

(10) Patent No.: US 6,169,512 B1
(45) Date of Patent: Jan. 2, 2001

(54) SIGNAL WAVE BASED DETECTION SYSTEM AND METHOD, WITH DIRECTION DEPENDENT TRANSMISSION PARAMETER

(75) Inventor: Patrick D. L. Beasley, Worcester (GB)

(73) Assignee: U.S. Philips Corporation, New York, NY (US)

(*) Notice: Under 35 U.S.C. 154(b), the term of this patent shall be extended for 0 days.

(21) Appl. No.: 08/834,406

(22) Filed: Apr. 16, 1997

(30) Foreign Application Priority Data

Apr. 23, 1996 (GB) .................................................. 9608368

(51) Int. Cl.[7] ........................................................ G01S 7/40
(52) U.S. Cl. ............................................. 342/174; 342/28
(58) Field of Search ..................................... 342/174, 165, 342/5, 7, 28

(56) References Cited

U.S. PATENT DOCUMENTS

| | | | |
|---|---|---|---|
| 3,573,826 | * | 4/1971 | Fredericks et al. .................. 342/174 |
| 3,623,107 | * | 11/1971 | Holdren, III .............................. 342/5 |
| 4,283,725 | * | 8/1981 | Chisholm ............................... 342/26 |
| 4,686,534 | * | 8/1987 | Eddy ..................................... 342/165 |
| 5,134,413 | * | 7/1992 | Bruder ................................... 342/174 |
| 5,140,331 | * | 8/1992 | Aulenbacher et al. .............. 342/165 |
| 5,164,734 | * | 11/1992 | Fredericks et al. .................. 342/172 |
| 5,204,682 | * | 4/1993 | Beasley ................................. 342/117 |
| 5,264,855 | * | 11/1993 | Lammers et al. .................... 342/159 |
| 5,294,935 | * | 3/1994 | Bauerle ................................. 342/174 |
| 5,311,191 | * | 5/1994 | Scannapieco ........................ 342/165 |
| 5,313,210 | * | 5/1994 | Gail ........................................ 342/25 |
| 5,345,243 | * | 9/1994 | Levis .................................... 342/173 |
| 5,495,254 | * | 2/1996 | Uemura et al. ...................... 342/174 |

* cited by examiner

Primary Examiner—John B. Sotomayor
(74) Attorney, Agent, or Firm—Anne E. Barschall

(57) ABSTRACT

An object detecting apparatus uses a radar system 24 which employs a directional antenna 6. A transmission parameter of the system 24 is calibrated for each transmission direction such that, at a boundary 22 of a detection area 20, there is a maximum signal intensity and a minimum sensitivity. The calibration is effected using reflectors of known reflective response which are positioned around the boundary 22 during calibration.

16 Claims, 2 Drawing Sheets

SIGNAL WAVE BASED DETECTION SYSTEM AND METHOD, WITH DIRECTION DEPENDENT TRANSMISSION PARAMETER

This invention relates to object detecting apparatus and particularly to intruder detection systems which provide imaging of a detection area. In addition, the invention relates to a method of calibrating such a detecting apparatus.

The use of radar is well known for detecting the position, and optionally the velocity, of objects within the range of the radar apparatus. It has been proposed to use radar for detecting the presence or motion of intruders in a defined area, for example so as to provide an alarm system.

If a radar imaging system is to be used for surveillance of an area including obstacles such as are found in a house or garden, the sensitivity of the system for certain areas will be greatly reduced by the presence of these obstacles. One possible solution to this problem is to select a transmission intensity which is such that all points within the detection area have a required minimum sensitivity, to enable intruder detection. A problem with this approach is that the signal intensity will be unnecessarily high in areas which are free of obstacles. One possible consequence of this is interference with systems operating outside the detection area.

Directional antennas are known for transmitting electromagnetic waves substantially in a predetermined direction.

According to the present invention, there is provided a method of calibrating an object detecting apparatus, the apparatus comprising imaging means having a transmitter for transmitting a signal wave substantially in a predetermined direction, and a receiver for receiving a reflected signal substantially from the predetermined direction, means being provided for altering the predetermined direction, the method comprising the steps of:

imaging a detection area having a boundary by transmitting signal waves in a plurality of directions and analysing the received reflected signal waves;

positioning signal wave reflector means of known reflection response at a plurality of positions around the boundary of the detection area;

imaging the detection area with the signal wave reflector means positioned, by transmitting signal waves in the plurality of directions and analysing the received reflected signal waves;

processing the detected images in order to obtain information concerning a boundary parameter of the imaging means at the boundary; and calibrating a transmission parameter of the transmitter for each direction so as to obtain a desired value of the boundary parameter at a part of the boundary corresponding to the respective direction.

The invention enables calibration of a detection apparatus which incorporates a directional antenna and which enables modification of a transmission parameter for different directions. The calibration method enables the transmission parameter to be adjusted according to the direction of the antenna so as to obtain desired boundary parameters.

The boundary parameter may be the sensitivity of the imaging means at the boundary. This enables detection of an object to be assured at any point within the detection area. This sensitivity is preferably obtained by subtracting the image of the detection area without the signal wave reflectors from the image of the detection area with the signal wave reflector means.

The boundary parameter may alternatively comprise the signal intensity at the boundary of the detection area. In this case, because the reflection provided by the signal wave reflectors is known, and because the attenuation of the reflected signal between the reflector and the receiver is equivalent to the attenuation of the original transmitted signal between the transmitter and the reflector, it is possible to calculate the signal intensity at the boundary from an analysis of the reflected signal.

A knowledge of the boundary signal intensity enables the transmission parameter to be calibrated so that the signal intensity outside the boundary does not exceed a predetermined threshold.

The transmission parameter may comprise the transmitted signal intensity, and this intensity may then be calibrated for each transmission direction.

The calibration may take into account both the signal intensity at the boundary and the sensitivity, so that a maximum signal intensity is provided at the boundary and, where this maximum intensity permits, a minimum sensitivity is also obtained. Where these two requirements are incompatible, the transmission parameter may additionally or alternatively comprise the transmission time in the predetermined direction, namely the dwell time of the transmitter in the respective direction. Increasing the dwell time has the effect of increasing the signal to noise ratio of the imaging means for target detection at the boundary, which results in improved sensitivity, without increasing the transmission intensity.

The signal wave is preferably an electromagnetic wave in the microwave region.

The invention also provides an object detecting apparatus for imaging a detection area having a boundary by transmitting signal waves and analysing the received reflected signal waves, comprising:

imaging means having a transmitter for transmitting a signal wave substantially in a predetermined direction;

a receiver for receiving a reflected signal from substantially the predetermined direction;

means for altering the predetermined direction; and means for altering a transmission parameter of the transmitter for each predetermined direction, the transmission parameter being selected for each predetermined direction such that the detection sensitivity of the apparatus at the boundary is greater than a predetermined sensitivity threshold, and the signal intensity at the boundary is below a predetermined intensity threshold.

In the apparatus of the invention, the boundary sensitivity for the majority of the boundary is preferably constant and is above a minimum level, so that detection within the boundary is ensured. In addition, the signal intensity at the boundary is limited.

The invention also provides a kit of parts comprising:

an object detecting apparatus comprising:

imaging means having a transmitter for transmitting a signal wave substantially in a predetermined direction;

a receiver for receiving a reflected signal from substantially the predetermined direction;

means for altering the predetermined direction; and means for altering a transmission parameter of the transmitter for each predetermined direction; and calibrating apparatus comprising:

means for processing first and second image signals of the object detecting apparatus to analyse differences between the first and second image signals; and signal wave reflector means having known reflective response, the means for processing first and second image signals including data concerning the reflective response of the signal wave reflector means.

This kit of parts provides an appropriate detection system and enables calibration according to the method of the invention.

Embodiments of the present invention will now be described, by way of example, with reference to the accompanying drawings, in which.

Figure 1:
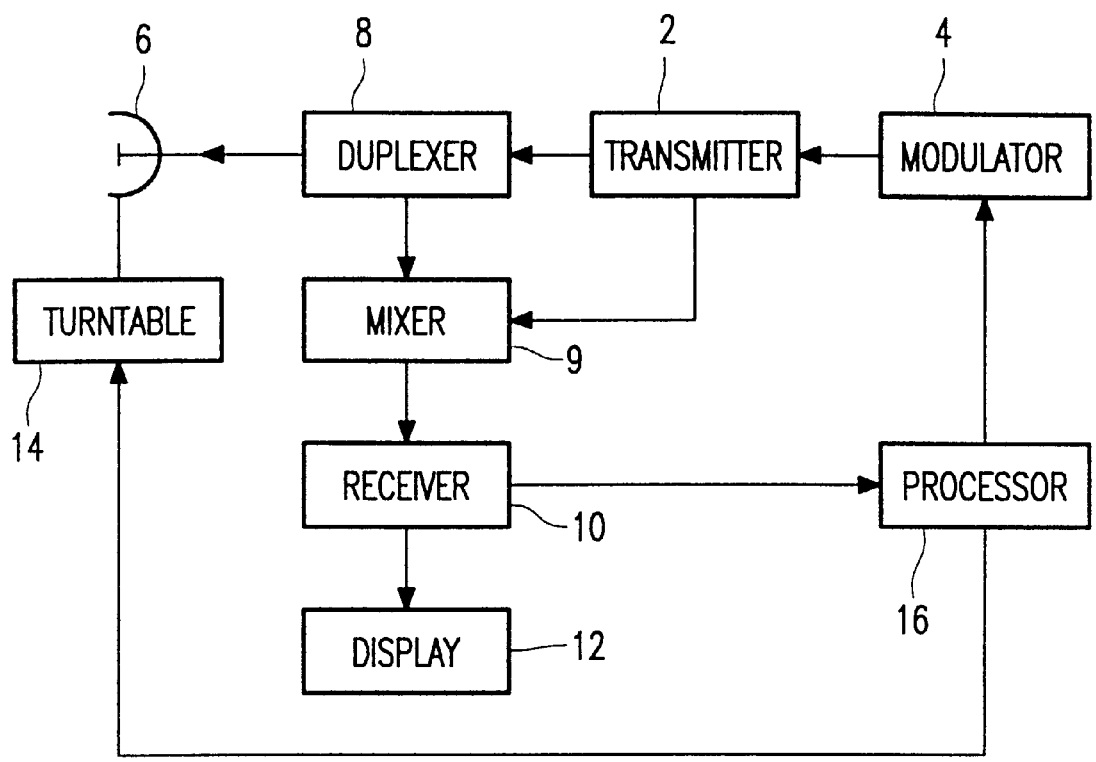
FIG. 1 shows one example of a known radar system, implemented in an apparatus according to the invention.

FIG. 1 shows, in simplified schematic form, a radar system, which comprises a transmitter 2, for example an oscillator, which is controlled by a modulator 4 to modify the transmitter signal. Various modulation techniques are known for radar systems, and the use of continuous waveforms (CW) for the oscillator is described in the following. In a basic CW radar, the doppler frequency shift enables separation of the received echo signal from the transmitted signal. Such a system detects movement, but an unmodulated continuous waveform cannot measure range. Range measurement can, however, be made by applying frequency or phase modulation.

The system of FIG. 1 relies upon frequency modulation (FMCW radar), and the modulator 4 changes the transmitter frequency as a function of time in a known manner. Typically, the transmitter 2 generates electromagnetic waves of a frequency falling within the microwave region, namely approximately 300 MHz to 30 GHz.

The signals produced by the transmitter 2 and modulator 4 are supplied to an antenna 6 via a duplexer 8. The waveform generated by the transmitter 2 is radiated into space by the antenna 6. The antenna 6 may also function as a signal receiver for the receiving circuitry, and the duplexer 8 channels the returned echo signals to the receiver portion of the circuitry.

In FMCW radar, the echo signal received comprises a time shifted signal derived from the originally transmitted signal. By mixing the transmission signal and the echo signal it is possible to produce a beat signal which provides a measure of the target range. These techniques are well known to those skilled in the art.

For this purpose, mixer 9 is provided which receives the echo signals from the duplexer 8 and the transmitter signal from the transmitter 2. Receiver circuitry 10 includes amplification and filtering stages and frequency analysis to identify the beats within the mixed signal. Conventionally, a display 12 is provided for providing a visual interpretation of the analysed echo signals.

The above description relates to the components which are conventional in FMCW radar. However, other forms of radar system may be employed in the apparatus of the invention. For example, a pulse radar system may be employed, which enables the range of a target to be determined from a measured delay of the echo, and the signal intensity of the echo signal may be used to determine the size of the target, according to the level of reflection.

In the detection system of the invention, a directional antenna 6 is employed, and a turntable 14 is provided for rotating the antenna to enable directed signal transmission for 360 degree rotation. The turntable is controlled by a processor 16, which also controls the modulator to enable one or more transmission parameters of the detection system to be varied in synchronism with the rotation of the antenna, as will be described in the following. The processor also receives signals from the receiver circuitry 10.

Figure 2:
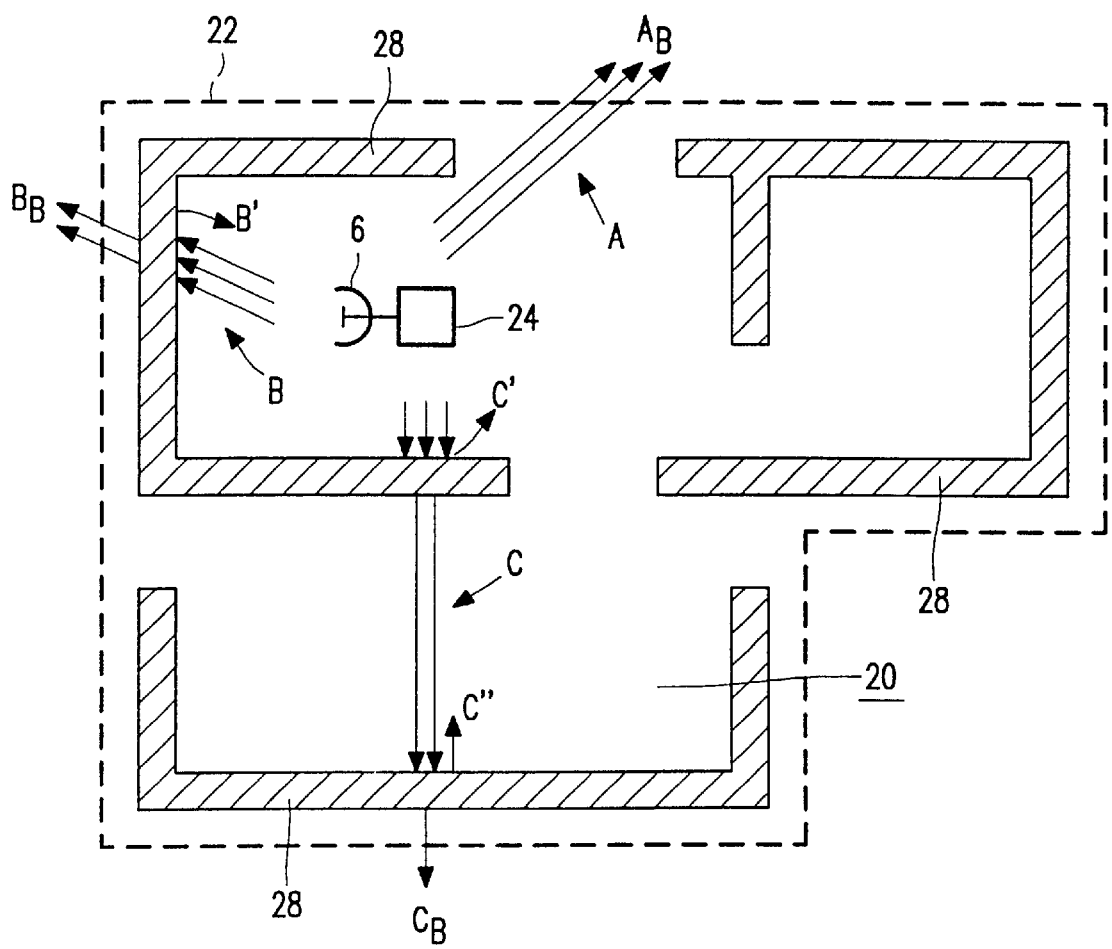
FIG. 2 shows a residential security system for the purposes of explaining the method of the invention.

FIG. 2 shows a sensor system to which the calibration method of the invention may be applied.

A detection area 20 is defined by a boundary 22 which may have an irregular shape. A radar transmitter and receiver system 24 enables the image within the boundary 22 to be sensed according to known radar operation.

The radar system 24 has a directional antenna 6 which may be rotated through 360° so as to scan the detection area 20. The antenna 6 may, for example, comprise a planar printed antenna, a horn antenna or a slotted waveguide. These, and further possibilities, will be apparent to those skilled in the art.

The detection area 20 shown in FIG. 2 represents a building, and the radar system 24 may be for detecting intruders into the building. The building is shown in simplified form to comprise a number of walls 28, which give rise to attenuation of the signal waves before they reach the boundary 22.

For example, signal wave A reaches the boundary 22 without obstruction from walls 28 and the attenuation of the beam (the drop in the power density) is dictated solely by the dispersion of the radiated signal wave.

For a directional antenna, the power density of electromagnetic radiation reduces (in free space) as the distance from the source increases in a manner governed by the equation;

$$\text{Power density} = \frac{P_t G}{4\pi R^2}$$

$P_t$ represents the power of the radar transmitter, G represents the gain of the directional antenna, which is a measure of the increased power radiated in the direction of the target as compared with the power that would have been radiated from an isotropic antenna (one which radiates uniformly in all directions), and R represents the distance from the source.

In FIG. 2, the number of parallel arrows is intended to represent the power density of the signal, but the dispersion described above is ignored for the purposes of explaining the present invention.

Ignoring the dispersion discussed above, signal wave A experiences no attenuation between the antenna 26 and the boundary 22. Signal wave B passes through one wall 28 before reaching the boundary 22, and is therefore attenuated, represented by two arrows reaching the boundary 22. Signal B' is also reflected from the wall 28, a portion of which is reflected in the direction of the antenna 26 which enables the detection system to detect the presence of the wall. Signal wave C passes through two walls 28 before reaching the boundary 22 and is therefore greatly attenuated. Signals C' and C" are also reflected from the walls 28 enabling the detection system to detect the presence of these obstacles, in the known manner. Of course, the signal attenuation and reflection will be more complicated than represented in FIG. 2.

The system of FIG. 2 is shown to transmit a uniform power density from the transmitter 24 at all angular positions of the antenna 26. The turntable 14 may be controlled to provide transmission every 5 degrees, for example. In FIG. 2, only three transmission directions are shown. The constant transmission signal intensity gives rise to signals at the boundary $A_B$, $B_B$, $C_B$, having different power densities. Similarly, the sensitivity of the detection system is different at different points of the boundary. For example, at points around the boundary of weak power density, the reflected signal from a given target will be less than at points of high power density.

The invention provides a method of calibrating the detection system of FIG. 2 so as to ensure constant sensitivity around the boundary 22 and/or provide a maximum power density at the boundary 22 so as to prevent interference of one detection system with a system operating in an adjacent detection area.

In accordance with the invention, an image of the detection area 20 is taken, which involves interpreting the echo signals, such as B', C' and C". In this way, an image may be built up of the detection area comprising range cells and azimuth cells, as is known in the prior art.

In order to obtain information concerning the boundary 22, reflectors are placed around the boundary pointing towards the receiver in order to alter the detected image.

Figure 3:
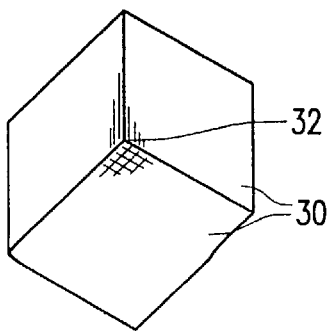
FIG. 3 shows a corner reflector which may be used in the calibration method of the invention.

Various reflectors are known having known reflectivity. An efficient reflector (namely having a high reflectivity) is a square corner reflector, such as that shown in FIG. 3. This comprises three faces 30 of a cube which each share one common corner 32. In the calibration method of the invention, such corner reflectors may be positioned at regular intervals around the boundary 22 and provide a reflected signal which is a known function of the power density of the signal directed at the reflector.

With reflectors located around the boundary 22, a new image is taken of the detection area 20 which will then incorporate echo signals produced by the corner reflectors.

Subtracting the echo signals of the first image detection (without reflectors) from the echo signals of the second image detection (with corner reflectors) enables an analysis of the additional signals produced by the reflectors. This analysis may be carried out by the processor, which then has an appropriate memory for storing signal information. Alternatively, the necessary comparisons may be carried out by a separate processor which is used only during installation.

The reflector signals can be used to determine the sensitivity of the detection system at the boundary 22 for the particular transmission direction. It is then possible, using the processor 16, to adjust the transmitter power output for each direction so that the system sensitivity at the boundary is constant for all directions. This approach enables detection of an intruder to be guaranteed since the system has a minimum sensitivity (the boundary sensitivity) at all points within the detection area 20.

There may, however, be situations in which the required transmitter output in order to obtain the desired signal sensitivity at the boundary may not be practical. This may be the case where there is high attenuation. Even if the transmitter power can be increased to the necessary level to obtain the desired sensitivity at the boundary, there may be an unacceptably high power density at the boundary. This may not be desirable for health risk reasons and may violate regulations concerning signal transmissions. In addition, where a high transmission power density is required to achieve the desired signal intensity at the boundary, short range targets may overload the receiver.

It is also possible to determine, from the reflector signals, the signal intensity at the boundary. This is possible because the attenuation of the reflected signal from the reflector to the receiver is the same as the attenuation of the transmitted signal between the transmitter and the reflector. Consequently, it is also possible to adjust the transmitter output power in order to obtain a desired signal intensity at the boundary 22. Thus, the system may be calibrated such that a maximum signal intensity is present at the boundary 22 to prevent violation of health radiation limits and to prevent interference between users of systems located close to each other. A maximum transmission power density may be desired to prevent overload of the receiver as described above, but this may be avoided by varying the gain of the receiver according to the range and azimuth position of the target.

Of course, the transmitter power may be adjusted to take account of both of the above two factors. Thus, it may be possible to maintain the maximum signal intensity at the boundary but, where possible, ensuring the required sensitivity at the boundary. There may be situations where it is not possible to achieve both of these aims by controlling only the transmission power. In such a case, it is also possible to increase the sensitivity of the boundary without increasing the signal intensity by adjusting the dwell time of the transmitter in the particular direction. Alternatively, the antenna gain may be increased so that additional transmitter power is not required. The effect of increasing the dwell time of the transmitter in a particular direction is to improve the signal to noise ratio of the signals received from the particular direction. This has the effect of increasing the sensitivity of the detection system in that direction, without increasing the transmitter power.

From a functional point of view, the most important consideration is for the sensitivity at the boundary to be above the threshold. However, if the calibration of transmission parameters described above does not enable the desired sensitivity to be achieved without increasing the boundary signal intensity above the intensity threshold, a reduced sensitivity may be tolerated for parts of the boundary so as to enable the reduced signal intensity.

In this case, there may be "dead zones" within the boundary over which the detection system has reduced sensitivity. However, a further advantage of the calibration system of the invention is that a knowledge of the system sensitivity at any particular position within the boundary may be obtained. In particular, although it has been described that reflectors are positioned around the boundary, additional reflectors may be positioned within the detection area 20 behind internal obstacles such as walls so that the sensitivity at every region within the boundary is known. For this purpose, a reflector would be required in each area within the boundary for which similar attenuation from the transmitter is experienced. This enables the user of the system to decide, from an analysis of the detection area and the associated sensitivities in each area, whether the position of such "dead zones" is tolerable.

When the calibration is carried out to obtain sensitivity information for all regions within the boundary, the signals received during use of the system may be processed to give information concerning the nature of the detected target (intruder). In this way, the system may distinguish between large targets and small targets, such as humans and pets.

If it is not possible to eliminate undesirable "dead zones", it may be necessary to include an additional transmitter. Of course, the sensitivity analysis enables the required position of any such additional transmitter to be determined.

A further advantage of the calibration method of the invention is that the system is able to formulate a map of the boundary shape, such that false alarms will not be given by bodies outside the boundary.

Although the invention has been described with reference to radar, a transmitter generating signal waves outside the range of wavelengths normally associated with radar could be contemplated. Furthermore, any known radar configuration which enables directional control may be applied in the present invention. The detection system may be applied inside a building, as in the example given. However, the detection area may equally be an outdoor area, for example the area within a fenced boundary.

In the description, and in the wording of the claims, imaging the detection area with the reflectors positioned follows imaging the area without reflectors. Of course, these steps may be performed in the opposite order, and the method claims should not be construed as limiting the order of these steps.

It has also been described that a plurality of reflectors is used to obtain the modified image. Of course, a single reflector may be provided and moved around the detection boundary during image detection, although this will greatly increase the calibration time. This possibility is not excluded from the invention as defined by the appended claims.

From reading the present disclosure, other modifications will be apparent to persons skilled in the art. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of calibrating an object detecting apparatus, the apparatus comprising imaging means having a transmitter for transmitting a signal wave substantially in a predetermined direction, and a receiver for receiving a reflected signal substantially from the predetermined direction, means being provided for altering the predetermined direction, the method comprising the steps of:

imaging a detection area having a boundary by transmitting signal waves in a plurality of directions and analysing the received reflected signal waves;

positioning signal wave reflector means of known reflection response at a plurality of positions around the boundary of the detection area;

imaging the detection area with the signal wave reflector means positioned, by transmitting signal waves in the plurality of directions and analysing the received reflected signal waves;

processing the detected images in order to obtain information concerning a boundary parameter of the imaging means at the boundary; and calibrating a transmission parameter of the transmitter for each direction so as to obtain a desired value of the boundary parameter at a part of the boundary corresponding to the respective direction.

2. A method as claimed in claim 1, wherein the boundary parameter comprises the sensitivity of the imaging means at the boundary.

3. A method as claimed in claim 2, wherein the sensitivity is found by subtracting the detected image of the detection area without signal wave reflectors positioned from the detected image of the detection area with signal wave reflectors positioned.

4. A method as claimed in claim 1, wherein the boundary parameter comprises, or further comprises, the signal intensity of the transmitted signal at the boundary.

5. A method as claimed in claim 4, wherein the signal intensity is found by determining the signal attenuation in the detection area in the predetermined direction.

6. A method as claimed in claim 1, wherein the transmission parameter comprises the signal intensity of the transmitted signal wave and/or the time of transmission in the predetermined direction.

7. A method as claimed in claim 1, wherein the signal wave is an electromagnetic wave, for example a microwave.

8. The method of claim 1 wherein
   the area is an interior of a building and contains at least one article that at least partially blocks the signal wave,
   the boundary comprises walls of the building,
   the transmitter is part of an intruder detection system, and
   the calibrating step includes compensating for the presence of the at least one article to achieve the desired value.

9. An object detecting apparatus for imaging a detection area having a boundary by transmitting signal waves and analysing the received reflected signal waves, comprising:
   imaging means having a transmitter for transmitting a signal wave substantially in a predetermined direction;
   a receiver for receiving a reflected signal from substantially the predetermined direction;
   means for altering the predetermined direction; and
   means for altering a transmission parameter of the transmitter for each predetermined direction, the transmission parameter being selected for each predetermined direction such that the detection sensitivity of the apparatus at the boundary is greater than a predetermined sensitivity threshold, and the signal intensity at the boundary is below a predetermined intensity threshold.

10. Apparatus as claimed in claim 9, wherein the transmission parameter is the signal intensity of the transmitted signal wave.

11. The apparatus of claim 9 wherein
    the apparatus is an intruder detection system,
    the boundary comprises walls of a building,
    the area is the interior of the building and contains at least one article which at least partially blocks the signal wave,
    the means for altering compensates for the presence of the at least one article to achieve desired detection sensitivity and intensity at the boundary.

12. A kit of parts comprising:
    an object detecting apparatus comprising:
      imaging means having a transmitter for transmitting a signal wave substantially in a predetermined direction;
      a receiver for receiving a reflected signal from substantially the predetermined direction;
      means for altering the predetermined direction; and
      means for altering a transmission parameter of the transmitter for each predetermined direction; and
    calibrating apparatus comprising:
      means for processing first and second image signals of the object detecting apparatus to analyse differences between the first and second image signals; and
      signal wave reflector means having known reflective response, the means for processing first and second image signals including data concerning the reflective response of the signal wave reflector means.

13. A kit of parts as claimed in claim 12, wherein the transmission parameter is the signal intensity of the transmitted signal wave.

14. The kit of claim 12 wherein the object detection apparatus is an intruder detection system.

15. An object detecting apparatus for imaging a detection area having a boundary by transmitting signal waves and analysing the received reflected signal waves, the apparatus comprising imaging means having a transmitter for transmitting a signal wave substantially in a predetermined direction, and a receiver for receiving a reflected signal substantially from the predetermined direction, means for altering the predetermined direction, signal wave reflector means of known reflection response at a plurality of positions around a boundary of a detection area calibration means for causing the apparatus to execute the following:

first imaging the detection area by transmitting signal waves in a plurality of directions and analysing the received reflected signal waves;

second imaging the detection area, using the signal wave reflector means, by transmitting signal waves in the plurality of directions and analysing the received reflected signal waves:

processing images resulting from the first and second detecting in order to obtain information concerning a boundary parameter of the imaging means at the boundary: and calibrating a transmission parameter of the transmitter for each of the plurality of directions so as to obtain a desired value of the boundary parameter at a part of the boundary corresponding to the respective direction.

16. The apparatus of claim 15 wherein the area is an interior of a building and contains at least one article that at least partially blocks the signal wave, the boundary comprises walls of the building, the transmitter is part of an intruder detection system, and the calibrating step includes compensating for the presence of the at least one article to achieve the desired value.

\* \* \* \* \*